United States Patent [19]
Andrews et al.

[11] 3,745,621
[45] July 17, 1973

[54] SLITTING AND ROUTING MACHINE

[75] Inventors: Theodore E. Andrews, Kutztown; John J. Weller, Emmaus, both of Pa.

[73] Assignee: Armstrong Cork Company, Lancaster, Pa.

[22] Filed: Dec. 15, 1971

[21] Appl. No.: 208,200

[52] U.S. Cl.................. 29/33 D, 29/33 R, 29/558, 83/9, 144/86, 90/11 C
[51] Int. Cl........................................... B23p 23/02
[58] Field of Search...................... 144/86; 90/11 C; 29/33 R, 33 D, 33 T, 558; 83/9, 54, 924

[56] References Cited
FOREIGN PATENTS OR APPLICATIONS
21,571  4/1930  Netherlands.......................... 144/86

Primary Examiner—Francis S. Husar
Attorney—Nichol M. Sandoe et al.

[57] ABSTRACT

The invention contemplates a method and apparatus for producing a bore of prescribed size and shape in elongated stock which is to be or has been longitudinally cut into separate halves, the bore being completely and correctly defined by segments cut into both halves. The invention has particular application to pipe or conduit insulation, as a relatively hard foamed urethane or other plastic, wherein accurate fit and insulation-thickness uniformity are significant factors. In the forms described, the bore is made by a routing tool, which is driven on a rotary axis which is radial to the longitudinal axis of the stock or workpiece, the tool shank passing between slightly separated matching halves of the workpiece. Guide-blade means in the plane of the bit axis and of the work-piece axis assures accurate separation for the routing operation, and for unsevered stock the guide-blade means includes a cutting edge operative just prior to the routing operation.

22 Claims, 7 Drawing Figures

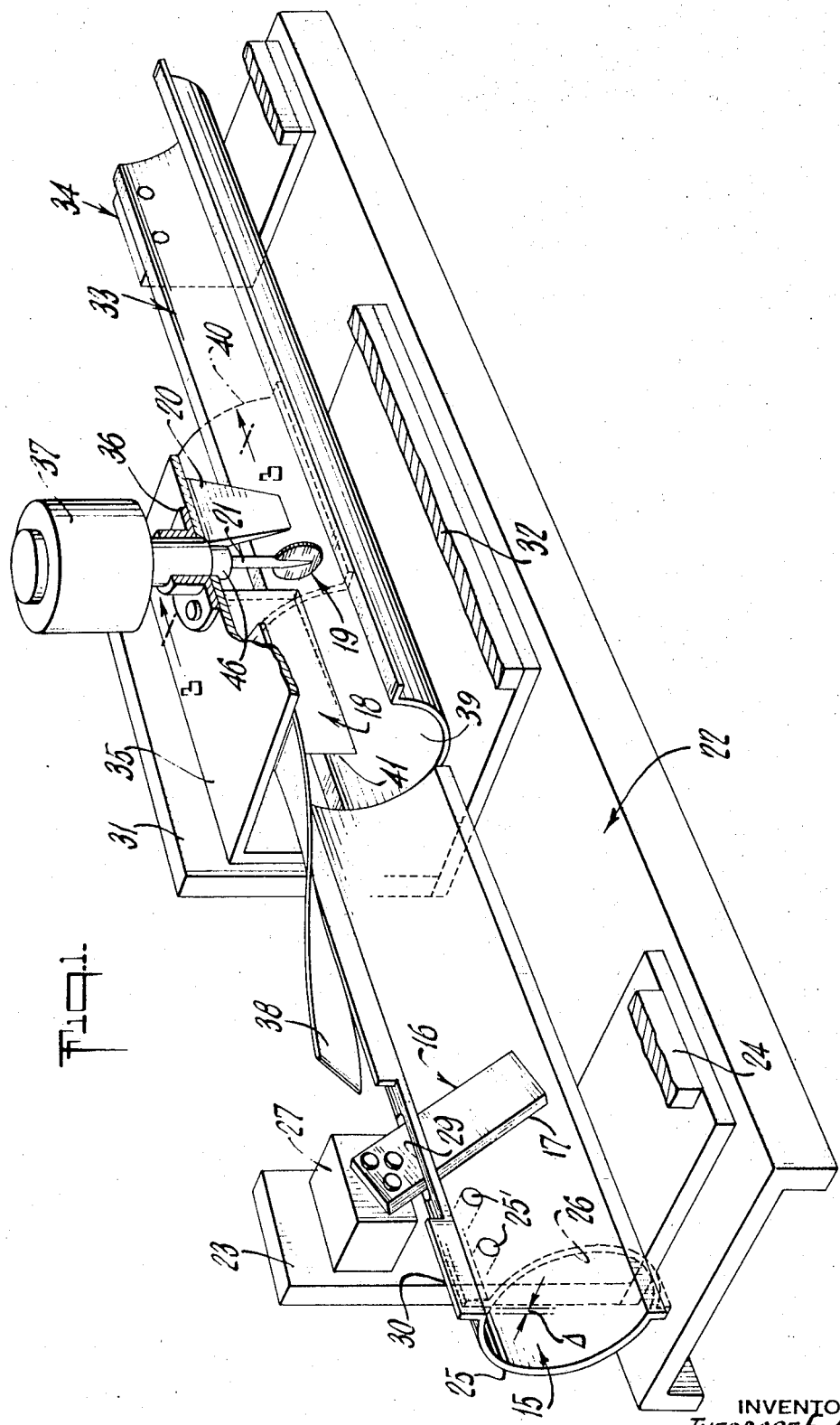

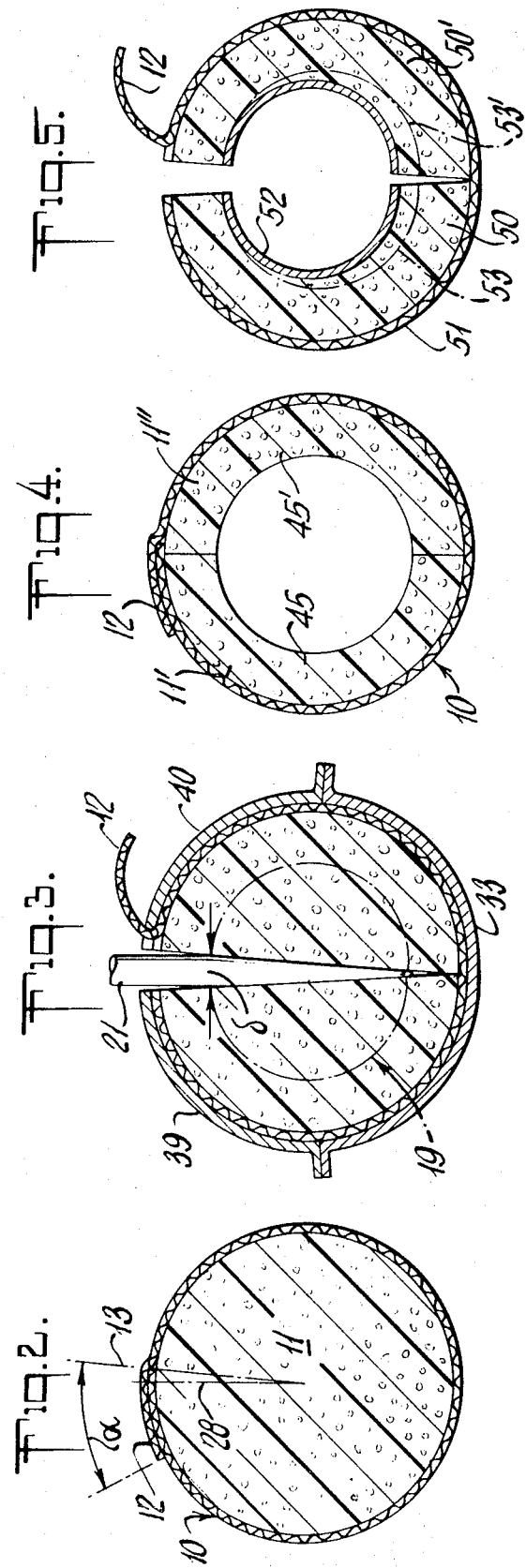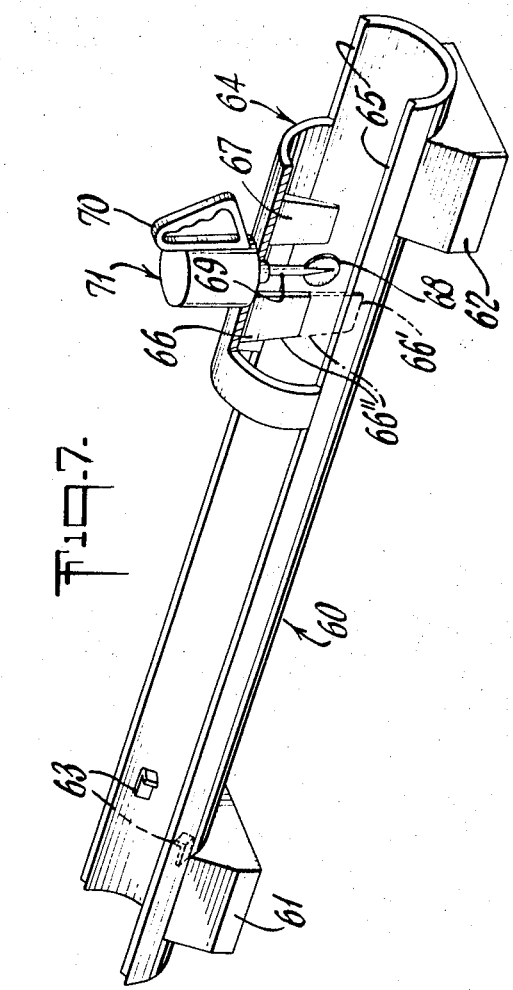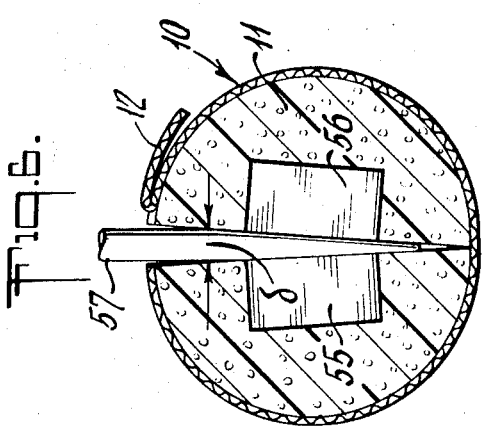

SLITTING AND ROUTING MACHINE

This invention relates to a method and means for producing a bore of prescribed size and shape in elongated stock which is to be or has been longitudinally cut into separate halves. The invention will be described in particular application to the definition of the bore in pipe insulation, as of relatively hard foamed plastic such as a cured urethane foam.

In Snelling U.S. Pat. No. 3,118,800, issued Jan. 21, 1964, there is described a method and apparatus for producing continuous foamed plastic conduit. Such conduit is ideally suited for pipe insulation; in practice, the continuous product is cut to standardized length, and is then longitudinally severed into semi-cylindrical annular halves, for each application to the pipe for which it has been designed. Such techniques call for large production of each particular size, because the conduit-producing machine must be shut down and completely re-set, in order to produce conduit of a different size. Further, when changing production from one size to another size, it is found that considerable product and material waste is generated before correct equilibrium conditions are established for the adequately concentric generation of the new-size conduit annulus.

It is, accordingly, an object of the invention to provide an improved method and means of the character indicated.

Another object is to provide a method and means for the more economical manufacture of conduit of the character indicated.

A further object is to achieve the above objects while also producing a superior product, in the sense of holding close tolerances as to bore contour and wall thickness.

It is also an object to provide a means of preparing a quality product of the character indicated, using, inter alia, the scrap or reject product of prior techniques.

A specific object is to provide a method and means whereby bore contour can be quickly selected, changed and cut from a given size of stock material.

Another specific object is to produce conduit of the character indicated, wherein a precision fit to standard pipe is inherently achievable, the fit being characterized by a direct interface between foam pockets and the pipe itself, i.e., without any skin or other intervening layer at the interface.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

FIG. 1 is a simplified view in perspective of a machine of the invention, with certain parts broken away and in section, and with other parts suggested by phantom outline, to reveal utmost overall detail of the cooperating parts;

FIG. 2 is an enlarged sectional view of one kind of stock material or workpiece, for use in the machine of FIG. 1;

FIG. 3 is an enlarged sectional view taken substantially at the plane 3—3 of FIG. 1, when the machine is operative upon the stock of FIG. 2;

FIG. 4 is a view similar to FIG. 2, after performing the operation of the machine of FIG. 1;

FIG. 5 is a view similar to FIG. 2, to show another kind of workpiece for supply to the machine of FIG. 1;

FIG. 6 is a similar view, to illustrate production of a modified bore; and

FIG. 7 is a simplified and partly broken away, perspective view of a modified apparatus of the invention.

In FIG. 1 of the drawings, the invention is shown in application to a machine for slicing and boring stock or workpieces, exemplified by the sectional view of FIG. 2. Such stock may be of a variety of compositions and shapes, and the bore contour may likewise be varied; however, for the selected illustrative example, the workpiece (FIG. 2) is cylindrical, having been formed continuously along its central axis, and cut to standardized length — for example, 3-inch diameter stock, cut to 4-foot lengths. The stock shown comprises a circumferential wrap of flexible sheath material 10, such as suitably treated paper, polyethylene or other plastic sheet, a fabric, or a metal foil, or a laminate of some of these materials. The wrap 10 contains a solid foamed plastic body 11, such as a foamed urethane of relatively hard, stiff and locally brittle character. The longitudinally extending edges of sheath 10 overlap at flap 12, of angular extent $\alpha$, sheath 10 being bonded to body 11 for the full circumferential extent, leaving flap 12 flexible and free to be raised and bent backward, along a longitudinally extending fold alignment at the limit (13) of bonding to body 11.

For the illustrative embodiment of FIG. 1, a cylindrical bore, concentric with the cylindrical sheath 10, is to be formed in the body 11, and for efficient performance as a thermal insulator, the resulting product must adhere to close tolerance requirements as to thickness uniformity in the annular insulating wall. For ease of application of the insulator to a pipe or conduit to be insulated, the product is to be formed as matching semi-cylindrical havles.

In the machine of FIG. 1, the workpiece of FIG. 2 is introduced, endwise, into a fixed guide-bore system 15 for accurately guided support as the workpiece is fed past a blade 16 having a sharp cutting edge 17 which is oriented dimetrically through the guide axis, to sever the workpiece into matching halves. A guide blade or wedge 18, in conjunction with a suitable tubular guide for the sheath 10, introduces a controlled angular separation of the sliced halves of the workpiece, so that a rotary cutter bit 19 (driven about a rotation axis which is radial and in the plane of blades 16–18) may generate the respective cylindrically arcuate halves of the desired bore. A further blade 20, aligned with blades 16–18 and with the shank 21 of the cutter bit 19 maintains workpiece stability throughout the process and until discharge at the far right end of the guide system.

More specifically, the machine of FIG. 1 is built on a fixed bed or frame 22 which extends the length of the machine. At the inlet or slicing end, upstanding spaced brackets 23–24 rigidly position opposed semi-cylindrical guide elements 25–26, sized for stabilized guidance of the particular sheath 10; for clarity of illustration, the guide element 26 is merely suggested by phantom outline of its axial end, it being understood to be an image match to the opposed guide element 25, and suitable fastening is suggested at 25'. Elements 25-26 are outwardly flanged at their longitudinally extending edges, being fastened at their lower edges and being fixedly spaced by the amount Δ at their upper edges. An offset 27 secured to or forming part of the bracket 23 establishes a firm reference for cantilevered support of blade 16 at its upper end, such that the cutting edge 17 extends diametrically across the section of guide bore 15, to a point just short of cutting the far side of the sheath 10; cutting edge 17 is also preferably inclined as shown with respect to the longitudinal guide axis, for more effective slicing action on the body 11 and on the upper part of sheath 10, without destruction or loss of body material. In FIG. 2, the upright axis 28 denotes the plane of slicing action, being slightly angularly offset from the flap-fold axis 13; this orientation is achieved by passing flap 12 through the gap Δ between upper flanges of guide elements 25–26, it being noted that a slot 29 for blade 16 is suitably angularly offset from the adjacent upper flange 30 of element 25.

Longitudinally downstream from the entrance and slicing region, just described, is a further system of spaced upright fixed brackets 31–32 for positioning the bore-cutting and stabilizing elements 18–19–20. Continued guidance of the workpiece is provided by an elongate semi-cylindrical trough 33 having an inner surface that is held smoothly continuous to that of elements 25–26; trough 33 may be fixed to the frame via connection at one end to brackets 31–32 and at the other end to a further bracket 34. A table 35 secured to brackets 31–32 above the alignment of guide bore 15 rigidly mounts the guide blades 18–20 from above and, at the same time, it accommodates the mounting flange 36 for the electric-motor-driven routing machine 37 for bit 19. To complete the identification of parts, a suitable twisted guide-finger element 38 is secured to table 35, to intercept the flap 12 and to fold the same backward along the fold axis 13, as suggested by the showing in FIG. 3. Finally, the support of the workpiece halves (in the routing region) is completed by cylindrically arcuate segments 39–40, carried by the outward flanges of trough 33 along the longitudinal edges of the latter.

In operation, a workpiece (FIG. 2) is entered into the longitudinal end of the guide bore 15, with flap 12 folded at 13 and projecting radially outward, through the gap Δ between upper guide flanges of elements 25–26. Router 37 is running, in anticipation of the bore cut. The workpiece is pressed longitudinally inwardly, either manually, or by a suitable feed mechanism (not shown). In passing the edge 17, the workpiece is longitudinally severed into matching halves, hingedly connected by the unsevered remote side of sheath 10. The thickness of blade 16 imparts an initial separation of the severed halves, about the hinged sheath connection, and the sharp or relatively narrow upstream edge 41 of wedge 18 readily enters the separating gap. Preferably, the body of blade 18 tapers inwardly in the radially inward direction and reaches a maximum thickness at its downstream end, at the maximum radius of the workpiece; this maximum thickness is preferably selected to exceed the diameter of the bit shank 21, so that the shank 21 performs no work on the adjacent severed edges or faces of the workpiece. In the course of reaching the routing region, the flap 12 will have been smoothly folded back, out of interference with routing action or bit-shank rotation. The bore contour is smoothly generated as long as the workpiece is fed, the final cut of a given workpiece being achieved by feeding the next workpiece, or by longitudinally removing the finished article at the discharge end. In the latter event, the second stabilizing blade 20 provides assurance of bore-cutting alignment until the very end of the workpiece. It will be understood that the effective diameter of the guide elements 33–39–40 is slightly enlarged from that at 15, to allow for the wedge action at 18 and to pilot the severed halves of the workpiece against the side faces of the wedge blade 18; FIG. 3 suggests that this relationship is adequate to enable the bit shank 21 to clear the separated halves of the workpiece.

As best seen in FIG. 3, the routing bit 19 comprises two like semi-circular blades secured at diametrically opposed locations to the conically tapered end of the shank 21. The angle of taper exactly matches the angular spread between separated halves of the workpiece. The nature of the foamed material 11 is such as to fragment and pulverize locally in the presence and path of the rapid blows struck by the bit blades in the course of high-speed rotation, the surface of revolution of these blades being characterized by a cross-section which is that of the circular bore halves 45–45' (FIG. 4), plus an angular offset δ (FIG. 3) which reflects the bit-shank diameter. Upon completion of the bore 45–45', the separated halves 11'—11" of the workpiece can be abutted, as shown in FIG. 4, with flap 12 substantially overlapping sheath 10 beyond the plane (28) of the cut. And since accurate position control of the halves 11'—11" and of the bit 19 is maintained at all times, the bore 45—45' can be held to close concentricity tolerances with respect to sheath 10.

It should be observed that bit 19 is selected for generating a bore to accurately fit a specified pipe diameter. For fit to a different pipe size, the same stock (FIG. 2) may be used, with an appropriate bit size. For example, the three-inch diameter stock initially mentioned in connection with FIG. 2 can serve with equal effectiveness for the thermal insulation of standard ½-inch, ¾-inch and 1-inch pipe sizes, merely by appropriate selection of bit size at 19, and otherwise using precisely the same machine of FIG. 1. It will be understood that the means whereby router 37 is secured to table 35 may be of a quick-release variety, thus simplifying the process of bit change, as needed, and in FIG. 1 the numeral 46 will be understood to identify chucking means for removably accommodating the replacement bit to router 37.

FIG. 5 is a sectional view to illustrate a modified type of stock, usable as the workpiece for the operations described in connection with FIG. 1. The stock of FIG. 5 comprises an elongated tube of foamed material 50, having an external sheath 51 (as at 10 in FIG. 2) and an internal sheath 52, as of paper. This stock may have been continuously formed as an annulus, by means of the character set forth in the above-identified patent, and FIG. 5 illustrates that through some maladjustment of the tube-forming mechanism, the inner wall 52 may not be concentric with the outer wall 51; the stock of FIG. 5 may thus be reject material which was produced while attempting to form a tubular wall of uniform thickness. The stock of FIG. 5 may also have been longitudinally slitted into matching halves (50—50'), as shown, as by means of mechanism described in copending application Ser. No. 113,342, filed Feb. 8, 1971. But FIG. 5 illustrates that, regardless of the eccentric bore, and regardless of whether or not the workpiece has already been slitted into separable halves, it is not necessary to condemn it to the scrap heap. The machine of FIG. 1 will gracefully accept its passage via the guide bore 15, using knife blade 16 to pilot the already severed halves, and a properly selected bit 19 will concentrically generate a new bore while disposing of the internal sheath 52; the phantom contours 53—53' suggest the routed bore halves, and the resulting product is just as able to meet concentricity specifications as that already described for the solid workpiece of FIG. 2. FIG. 4 is thus equally able to illustrate the product of the machine of FIG. 1, whether the initial workpiece is as shown in FIG. 2 or FIG. 5.

Thus far, the descripiton has proceeded on the assumption that a concentric bore is to be formed in cylindrical stock. It will be understood, however, that a deliberately eccentric bore can be provided by proper design and selection of bit 19, and by appropriate positioning of the same with respect to the guided central longitudinal axis of the workpiece. Also, the bore may be of other shapes and contours, as illustrated by the square section generated by rotation of blades 55–56 on the shank 57 in FIG. 6; again, it is noted that the angular offset δ (reflecting diameter of shank 57) separates the half-square blade elements 55–56, to enable formation of a perfect-square bore section in the workpiece. Still further, it will be understood that for external or sheath contours other than circular (for example, a square external periphery), the machine of FIG. 1 need only be modified as necessary at the guide bore 15 (i.e., parts 25–26–33–39–40) to receive, locate, orient and support the extenral contour of the stock, in its longitudinal traversal of the slicing and routing stations of the machine.

It will be seen that the described invention achieves all stated objects, enabling precision manufacture of insulation jackets or the like, for a variety of internal and external contours. Economy is realized through use of the same size basic stock to serve bores of different sizes, the only change necessary being substitution of the bit 19, as appropriate. Further economy is realized through an ability to use workpieces previously regarded as reject or scrap material. And whatever the original nature of the workpiece, the final product is characterized by a skinless bore which is thus able to present foamed-material cavities directly at the interface with the pipe or conduit to which it is fitted.

While the invention has been described in detail for the preferred form shown, it will be understood that modifications may be made without deparature from the invetion. For example, the elongation axis of the guide bore 15 may be oriented vertically, the inlet being at the upper end, so as to facilitate gravity-feed of plural workpieces in an elongate inlet 15, and at the same time to provide a natural gravity discharge for the pulverized offal which results from routing action.

Still further, the machine may have means for the longitudinally fixed retention of the workpiece, during a longitduinally guided traverse of the work by the routing longitudinally and its associated guide blades; such an embodiment is illustrated in FIG. 7, wherein an elongate semi-cylindrical trough 60 is supported on a horizontal axis, between base elements or feet 61–62. The trough 60 is selected for length substantially exceeding the length of the workpiece, and for curvature appropriate to support and stabilize the sheath 10 of the workpiece. Stop means such as a lug 63 fixed in trough 60, and substantially short of the end of trough 60, provides axial retention of the workpiece during a working traverse of a tool slide 64, from right to left, in the sense of FIG. 7. Slide 64 is shown as cylindrically arcuate, of curvature appropriate to the accommodation of separate halves of the workpiece, the longitudinal edges being shaped for guidance and support in suitable channels 65 in the corresponding edges of trough 60. Front and back stabilizing blades 66–67, in the same upstanding plane, are on opposite sides of the router bit 68 and its shank 69, and a handle 70 on the router motor housing 71 provides a convenient means of manually propelling the slide 64 for a working traverse of the workpiece. If the workpiece has already been sliced into matching elongate semi-cylindrical halves, as in FIG. 5, then the front blade 66 performs merely the wedging action discussed above for blade 18, it being understood that flap-guide means (similar to guide element 38) is provided on slide 64 to fold the workpiece flap 12 out of the path of the router bit and its shank. If on the other hand, the stock has not been sliced, then blade 66 may be of greater cantilevered extent, as suggested by phantom outline 66', and with a forward knife or slicer edge 66", as discussed at 17 in the case of blade 16; of course, the work-positioning lug means 63 should be angularly offset from the path of blade 66—66' and router bit 68, so as to allow full passage of the bit 68 through the work, without sacrifice of guided support for slide 64. The tool of FIG. 7 will be seen as convenient for field use, wherein basic uncut stock of the same external diameter is to be bored to fit a variety of different pipe sizes needed as a given pipe installation is being made, the only change necessary being bit substitution in the chuck of the tool 71.

Throughout this specification, the use of a router and of a spade-type bit has of course covered the preferred technique of generating the desired bore contour in the work. The use of this terminology will, however, additionally be understood to be broadly descriptive to other types of cutting devices, as may be appropriate to generate the bore contour in various kinds of body material 11. For exmaple, vibratory tool elements, such as ultrasonically driven elements, may be preferred if the body material 11 is sufficiently brittle to pulverize on tool-element impact. The principal point is that the bore-cutting tool is radially positioned in the gap between longitudinally severed workpiece halves, and the effective cutting profile of the tool element matches the desired bore, plus the angular or radial offset apropriate to the effective width of the bit shank or of such other element or elements 18–33–39–40 as may determine work-half separation.

What is claimed is:

1. Apparatus for forming a characterized bore in an elongated workpiece of substantially constant cross-section comprising a frame including elongated workpiece support means for establishing a fixed orientation of the elongation axis of the workpiece, and tooling carried by said frame and including router means and blade means including a knife edge, said blade means and router means being symmetrically supported with respect to a single radial plane which includes a generally central elongated axis of the workpiece support means, said knife edge being forward of said router means, whereby a workpiece may be at least partially severed without substantial removal of workpiece material, said router means including a shank driven in rotation on an axis extending generally radially in said plane and generating a cutting surface of revolution having a cross-section of the desired characterized-bore section plus a radial offset at least as great as the shank radius, said blade means having a maximum thickness substantially equal to the shank diameter, and said frame including means for the guided longitudinal traverse of the workpiece and of said tooling with respect to each other.

2. Apparatus according to claim 1, in which said tooling is relatively fixed and said last-defined means includes an elongated workpiece guide forming part of said support means.

3. Apparatus for forming a characterized bore in an elongated workpiece of substantially constant cross-section, comprising a frame including elongated workpiece support means for establishing a fixed orientation of the elongation axis of the workpiece, and tooling carried by said frame and including balde means and router means symmetrically supported with respect to a single radial plane which includes a generally central elongated axis of the workpiece support means, said router means including a shank driven in rotation on an axis extending generally radially in said plane ang generating a cutting surface of revolution having a cross-section of the desired characterized-bore section plus a radial offset at least as great as the shank radius, said blade means having a maximum thickness substantially equal to the shank diameter, and said frame including an elongated guide and said tooling including a slide movable along said guide for the guided longitudinal traverse of the workpiece and of said tooling with respect to each other.

4. Apparatus for forming a characterized bore in an elongated workpiece of substantially constant cross-section, comprising a frame including elongated workpiece support means for establishing a fixed orientation of the elongation axis of the workpiece, and tooling carried by said frame and including blade means and router means symmetrically supported with respect to a single radial plane which includes a generally central elongated axis of the workpiece support means, said router means including a shank driven in rotation on an axis extending generally radially in said plane and generating a cutting surface of revolution having a cross-section of the desired characterized-bore section plus a radial offset at least as great as the shank radius, said blade means being of wedge-shaped varying thickness having a maximum thickness substantially equal to the shank diameter, said blade means having a relatively thin leading-edge portion longitudinally more remote from said routing means than said maximum-thickness portion, and said frame including means for the guided longitudinal traverse of the workpiece and of said tooling with respect to each other.

5. Apparatus according to claim 1, in which said blade means comprises blade elements aligned with each other and with the rotary axis of said routing means and on opposite longitudinal sides of said routing means.

6. Apparatus according to claim 1, in which said cutting edge extends substantially fully across the workpiece-supporting region of the workpiece support means.

7. Apparatus according to claim 1, in which said cutting edge is also inclined to said elongation axis.

8. Apparatus for forming a characterized bore in an elongated workpiece having a cylindrical outer surface, comprising a frame including a concave cylindrical support conforming to and for guiding the workpiece by its cylindrical outer surface, knife means carried with said support and including a cutting edge extending substantially diametrically across the concave support for at least partially separating into two matching halves an elongated workpiece fed into said support and in the direction toward said cutting edge, whereby the separation may be achieved substantially without loss of workpiece material, and a routing tool carried by said frame and including a bit shank on a rotary axis which extends radially of the support axis in general alignment with the radial plane which includes the cutting edge and at a location downstream from the cutting edge, whereby the two halves may be separated at least to an extent permitting tool-shank passage between knife-cut adjacent surfaces of said halves, said tool including a cutting element which generates a surface of revolution having a cross-section matching that of the characterized bore at a radial offset which is at least substantially one-half such separation of the workpiece parts.

9. Apparatus according to claim 8, for operation on a workpiece having a relatively thin flexible peripheral sheath, said knife means having a cantilevered-support relation with said frame and said cutting edege extending diametrically to a location short of severing the diametrically remote part of said sheath, whereby the sheath hingedly retains otherwise severed halves of the workpiece.

10. Apparatus according to claim 8, in which said concave support overlaps the region of routing action and, at said region, is of sufficiently larger effective diameter than that of an uncut workpiece as to allow separation of severed workpiece halves to at least the extent of permitting routing-shank passage between separated workpiece halves.

11. Apparatus according to claim 10, and including a guide blade carried by said frame and projecting radially within the concave support in alignment with and proximate to the routing shank.

12. Apparatus according to claim 11, in which the effective maximum width of said guide blade is at least as great as the diameter of the routing shank.

13. Apparatus according to claim 11, in which the effective maximum width of said guide blade exceeds the diameter of the routing shank and is angularly symmetrically positioned with respect to the plane which includes the elongated axis and the rotary axis of the routing shank.

14. Apparatus according to claim 12, in which the extent of effective enlargement of the concave support at the region of routing action is substantially matched to the effective maximum width of the guide blade, thereby assuring positive retention of separated workpiece halves throughout routing action.

15. Apparatus according to claim 11, in whcih said guide blade is one of two, said two blades being on opposite longitudinal sides of the rotary axis and in the plane of the rotary axis.

16. Apparatus according to claim 11, in which said guide blade is positioned upstream from said routing shank and is of tapering thickness which converges in the radially inward direction.

17. Apparatus according to claim 9, for operation on a workpiece in which the sheath is a circumferential wrap with a longitudinally extending free flap in a region of circumferential overlap of the longitudinal edges of the sheath, said support including flap-folding guide means operative to fold the flap back over adjacent sheath material, the angular location of the fold being adjacent to but offset from said radial plane such that, for a workpiece oriented for flap-folding by said guide means, the workpiece is cut by said knife means in a region capable of later coverage by the flap when bent to its original circumferentially overlapping position.

18. Tthe method of forming a characterized bore in an elongated workpiece of substantially constant cross-section, which comprises slitting the workpiece along a path which lies substantially in an elongated plane through a generally central axis of symmetry of the bore to be formed, thereby defining two at least partially separable parts of the workpiece, holding the workpiece parts in face-to-face at least partially separated relation, selecting a rotary cutting tool which generates a surface of revolution of cross-section having the desired bore-section characterization plus a radial offset equal to one half the separation of the workpiece parts, rotating said tool about an axis which is radial with respect to said central axis and substantially in the slit plane and with said surface of revolution symmetrically positioned with respect to said central axis, and longitudinally traversing said tool and workpiece with respect to each other.

19. The method of claim 18, for operation on a workpiece having a flexible peripheral sheath, the slitting extending to just short of severing the sheath, whereby the sheath serves as a hinged connection of the otherwise fully severed halves of the workpiece.

20. The method of claim 18, for operation on a workpiece of solid uniform section throughout, the slitting extending to at least the maximum effective radial extent of the rotary cutting tool.

21. The method of claim 18, for operation on a workpiece having an elongated bore of undesired contour and of cross-section less than that of said surface of revolution, the slitting extending to at least the extent of severing the workpiece on one radial side of the bore.

22. The method of claim 18, for operation on a cylindrical workpiece, and wherein the rotary cutting tool is selected to generate a surface of revolution characterized by a half-section which is semicircular at said offset, the center of the semi-circle being positioned for substantial coincidence with the workpiece axis.

* * * * *